US012701238B2

(12) United States Patent
Wang et al.

(10) Patent No.: US 12,701,238 B2
(45) Date of Patent: Aug. 4, 2026

(54) VIDEO ASSET QUALITY ASSESSMENT AND ENCODING OPTIMIZATION TO ACHIEVE TARGET QUALITY REQUIREMENT

(71) Applicant: IMAX CORPORATION, Mississauga (CA)

(72) Inventors: Zhou Wang, Waterloo (CA); Hojatollah Yeganeh, Waterloo (CA); Kai Zeng, Kitchener (CA); Jiheng Wang, Waterloo (CA); Abdul Rehman, Kitchener (CA)

(73) Assignee: IMAX CORPORATION, Mississauga (CA)

( * ) Notice: Subject to any disclaimer, the term of this patent is extended or adjusted under 35 U.S.C. 154(b) by 0 days.

(21) Appl. No.: 17/552,022

(22) Filed: Dec. 15, 2021

(65) Prior Publication Data

US 2022/0201317 A1      Jun. 23, 2022

Related U.S. Application Data

(60) Provisional application No. 63/129,406, filed on Dec. 22, 2020.

(51) Int. Cl.
H04N 19/154 (2014.01)
H04N 17/00 (2006.01)
(Continued)

(52) U.S. Cl.
CPC ........... H04N 19/154 (2014.11); H04N 17/00 (2013.01); H04N 19/119 (2014.11); (Continued)

(58) Field of Classification Search
CPC .. H04N 19/154; H04N 19/162; H04N 19/136; H04N 19/17; H04N 17/00; H04N 19/119; H04N 19/19
See application file for complete search history.

(56) References Cited

U.S. PATENT DOCUMENTS 6,324,301 B1 * 11/2001 Jacquin ..................... G06T 5/70
                                                        375/E7.193
9,049,420 B1 * 6/2015 Wang ................... H04N 19/154
                               (Continued)

OTHER PUBLICATIONS

Lee et al., "A VBR Video Encoding for Locally Consistent Picture Quality With Small Buffering Delay Under Limited Bandwidth", in IEEE Transactions on Broadcasting, vol. 58, No. 1, pp. 47-56, Mar. 2012.

*Primary Examiner* — Talha M Nawaz
(74) *Attorney, Agent, or Firm* — BROOKS KUSHMAN P.C.

(57)                ABSTRACT

Aspects of the present disclosure relate to the assessment on how well and consistent the quality of a video asset satisfies a given target quality level or a time-varying target quality curve, and the optimization on encoding configuration to achieve the best compromise between satisfying the target quality requirement and saving the bit rate/bandwidth cost. The application scope of the present disclosure is generally in, but not limited to, the field of video coding and distributions, including both live and file-based video encoding, broadcasting and streaming systems. Methods and systems implemented based on the present disclosure may achieve the highest accuracy approaching any given target quality with the smoothest quality variation over time, while maximally reduce bit rate/bandwidth and video distribution cost by optimally determining video encoding configurations and parameters.

29 Claims, 10 Drawing Sheets

(51) Int. Cl.
    *H04N 19/119*     (2014.01)
    *H04N 19/136*     (2014.01)
    *H04N 19/162*     (2014.01)
    *H04N 19/17*     (2014.01)
    *H04N 19/19*     (2014.01)

(52) U.S. Cl.
    CPC ......... *H04N 19/136* (2014.11); *H04N 19/162*
    (2014.11); *H04N 19/17* (2014.11); *H04N*
    *19/19* (2014.11)

(56)         References Cited

U.S. PATENT DOCUMENTS

| | | | | |
|---|---|---|---|---|
| 9,621,900 | B1* | 4/2017 | Ostiguy | H04N 19/184 |
| 10,999,578 | B2* | 5/2021 | Chen | H04N 19/103 |
| 2002/0168007 | A1* | 11/2002 | Lee | H04N 19/176 |
| | | | | 375/E7.176 |
| 2002/0169754 | A1* | 11/2002 | Mao | G06F 16/3347 |
| | | | | 707/E17.08 |
| 2004/0012675 | A1* | 1/2004 | Caviedes | H04N 17/004 |
| | | | | 375/E7.162 |
| 2004/0175056 | A1* | 9/2004 | Lee | G06T 7/13 |
| | | | | 348/E17.001 |
| 2005/0047503 | A1* | 3/2005 | Han | H04N 19/619 |
| | | | | 375/240.12 |
| 2005/0201468 | A1* | 9/2005 | Tsai | H04N 19/615 |
| | | | | 375/240.18 |
| 2005/0243917 | A1* | 11/2005 | Lee | H04N 19/895 |
| | | | | 375/240.03 |

| | | | | |
|---|---|---|---|---|
| 2006/0262191 | A1* | 11/2006 | Straney | H04N 17/00 |
| | | | | 348/181 |
| 2008/0298464 | A1* | 12/2008 | Hinz | H04N 19/147 |
| | | | | 375/E7.134 |
| 2010/0166070 | A1* | 7/2010 | Goel | H04N 19/44 |
| | | | | 375/E7.188 |
| 2011/0296485 | A1* | 12/2011 | Nilsson | H04L 65/80 |
| | | | | 725/114 |
| 2012/0044323 | A1* | 2/2012 | Chen | H04N 17/00 |
| | | | | 348/43 |
| 2014/0119432 | A1 | 5/2014 | Wang | |
| 2015/0089557 | A1* | 3/2015 | Busse | H04N 21/8456 |
| | | | | 725/95 |
| 2016/0105728 | A1* | 4/2016 | Schmidmer | H04N 21/64723 |
| | | | | 725/110 |
| 2016/0212432 | A1* | 7/2016 | Wang | H04N 19/154 |
| 2017/0125064 | A1* | 5/2017 | Aggarwal | H04N 5/222 |
| 2017/0237983 | A1* | 8/2017 | Adsumilli | H04N 21/234345 |
| | | | | 375/240.03 |
| 2017/0244991 | A1* | 8/2017 | Aggarwal | G06V 20/46 |
| 2018/0005666 | A1* | 1/2018 | Yang | G11B 27/326 |
| 2019/0253763 | A1 | 8/2019 | Beheydt et al. | |
| 2019/0325578 | A1* | 10/2019 | Mohammad | G06T 7/11 |
| 2019/0327510 | A1* | 10/2019 | Kalagi | H04N 21/44209 |
| 2019/0379895 | A1* | 12/2019 | Katsavounidis | H04N 19/196 |
| 2020/0021865 | A1* | 1/2020 | Topiwala | H04N 19/172 |
| 2020/0169593 | A1 | 5/2020 | Katsavounidis | |
| 2020/0364518 | A1* | 11/2020 | Xu | G06T 7/11 |
| 2020/0413099 | A1* | 12/2020 | Su | H04N 19/132 |
| 2022/0046318 | A1* | 2/2022 | Sundar | H04N 19/154 |
| 2022/0084313 | A1* | 3/2022 | Li | G11B 27/031 |

* cited by examiner

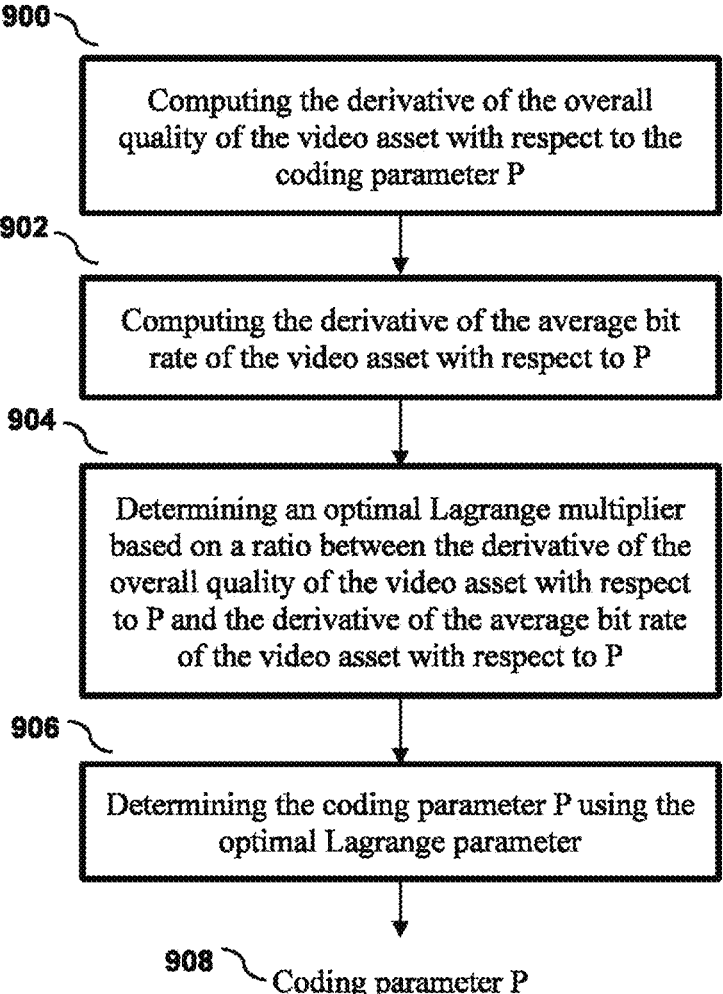

900

Computing the derivative of the overall quality of the video asset with respect to the coding parameter P

902

Computing the derivative of the average bit rate of the video asset with respect to P

904

Determining an optimal Lagrange multiplier based on a ratio between the derivative of the overall quality of the video asset with respect to P and the derivative of the average bit rate of the video asset with respect to P

906

Determining the coding parameter P using the optimal Lagrange parameter

908 Coding parameter P

FIG. 9

VIDEO ASSET QUALITY ASSESSMENT AND ENCODING OPTIMIZATION TO ACHIEVE TARGET QUALITY REQUIREMENT

CROSS-REFERENCE TO RELATED APPLICATIONS

This application claims the benefit of U.S. provisional application Ser. No. 63/129,406 filed Dec. 22, 2020, the disclosure of which is hereby incorporated in its entirety by reference herein.

TECHNICAL FIELD

Aspects of the disclosure generally relate to the quality assessment and optimization of digital videos in video distribution systems.

BACKGROUND

In practical live and file-based video distribution systems, the quality of a video asset (a video channel or a video file) being delivered from sender to receiver often varies dramatically over time. In some cases, the system may have a pre-set target quality and may receive instantaneous user input of time-varying target quality, so as to deliver the video of smoothly varying quality at a quality level as close to the target quality as possible. When the video quality is lower than the target quality, at the receiver side the viewers suffer from poor quality-of-experience (QoE). On the other hand, when the video quality is higher than the target quality, unnecessarily higher bit rate/bandwidth may be used, and the video distribution may suffer from excessive cost and higher risk of transmission delays, transmission errors, and decoding errors, which often lead to increased probability of failed/interrupted delivery, video buffering and rebuffering, and annoying visual artifacts in the videos received and presented at the receiver ends.

SUMMARY

In a first illustrative embodiment, a method for assessing video quality of a video asset given a target quality is provided. The video quality of the video asset is assessed at each of a plurality of time instances to determine a plurality of raw per-instance quality measures for the video asset. Each of the raw per-instance quality measures is adjusted into adjusted per-instance quality measures based on the target quality for video assets. The adjusted per-instance quality measures at each of the plurality of time instances are aggregated into an overall quality assessment of the video asset.

In one or more illustrative examples, a system for assessing video quality of a video asset given a target quality is provided. The system includes a computing device programmed to assess the video quality of the video asset at each of a plurality of time instances to determine a plurality of raw per-instance quality measures for the video asset; adjust each of the raw per-instance quality measures into adjusted per-instance quality measures based on the target quality for video assets; and aggregate the adjusted per-instance quality measures at each of the plurality of time instances into an overall quality assessment of the video asset.

BRIEF DESCRIPTION OF THE DRAWINGS

FIG. 9 illustrates an example of the flow diagram to find the coding parameter that is optimal for encoding a video asset.

DETAILED DESCRIPTION

Figure 1:
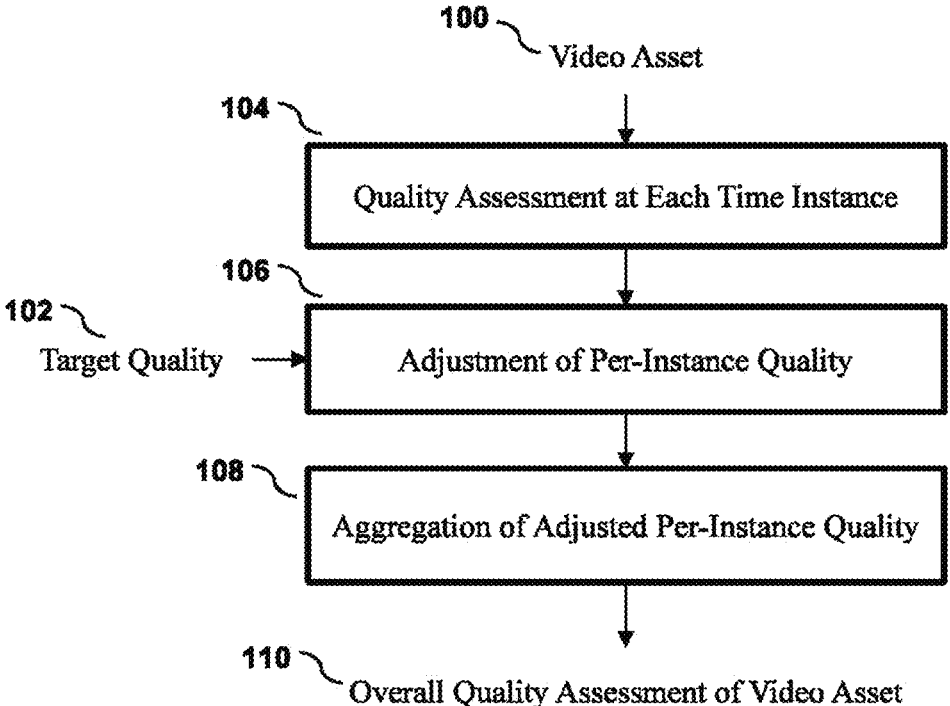
FIG. 1 illustrates an example of the flow diagram to assess the quality of a video asset given a target quality.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Significant challenges may occur in practice to perform video asset quality assessment that evaluates the accuracy and consistency how a video asset meets the target quality requirement, as well as to optimize the resources allocated to different parts of the video, so as to achieve the best compromise between meeting the target quality requirement and saving the bit rate/bandwidth and other resources in video distributions.

In this disclosure, a video asset 100 refers to a sequence of two-dimensional images, known as video frames, of time indices that may form a live stream of video or be stored in a file. The number of frames per second (fps) may be used to define the framerate of the video asset. The average number of bits used to represent or encode each second of the video content in the units of bits per second (bps) may be used to denote the bitrate of the video asset. A video asset may be broadcasted through a live streaming channel or streaming service or may be used for an on-demand service. Video assets are one of the inputs to the disclosed methods or systems, and may be consumed in a wide variety of applications that include but are not limited to live broadcasting systems, video conferencing, video on demand (VoD), gaming, and over the top (OTT) video delivery systems.

Aspects of the disclosure generally relate to methods or systems that assess the quality of the video asset based on a given target quality 102. Another aspect of the present disclosure relates to selecting a time instance from a video asset and performing a per time instance quality assessment at operation 104. Different types of video quality assessment techniques may include subjective testing and objective video quality metrics (such as no-reference (NR), reduced-reference (RR), and full-reference (FR) methods), which may be adopted to assess the per time instance quality of a video asset. Examples of such methods include Mean Square Error (MSE), Peak Signal to Noise Ratio (PSNR), Mean Absolute Error (MAE), Structural SIMilarity index (SSIM), Multi-Scale SSIM (MS-SSIM), VQM, SSIMPLUS, and VMAF. Yet another aspect of the present disclosure relates to adjusting the per-instance quality based on the given target quality at operation 106. The given target quality may vary depending on different video assets, different display devices, different types of services, and different service levels. The list of adjustment methods includes performing finite impulse response (FIR) or infinite impulse response (IIR) filters, clipping instance quality scores based on a threshold value, and applying any sort of transformation to per instance quality scores and then modifying the scores in the transform domain. Yet another aspect of the present disclosure relates to aggregating the adjusted per-instance quality at operation 108 into an overall quality assessment of the video to determine an overall quality score 110. Examples of such aggregation include calculating weighted averaging, taking percentile average, and performing order statistical operations.

FIG. 1. illustrates an example of the workflow diagram presented in the present disclosure where a video asset 100 is used and a target quality 102 is provided. A quality assessment operation 104 is performed at each time instance. The per instance quality scores are adjusted in operation 106. Eventually an overall quality score 110 of the video asset 100 is provided after carrying out aggregation at operation 108.

Figure 2:
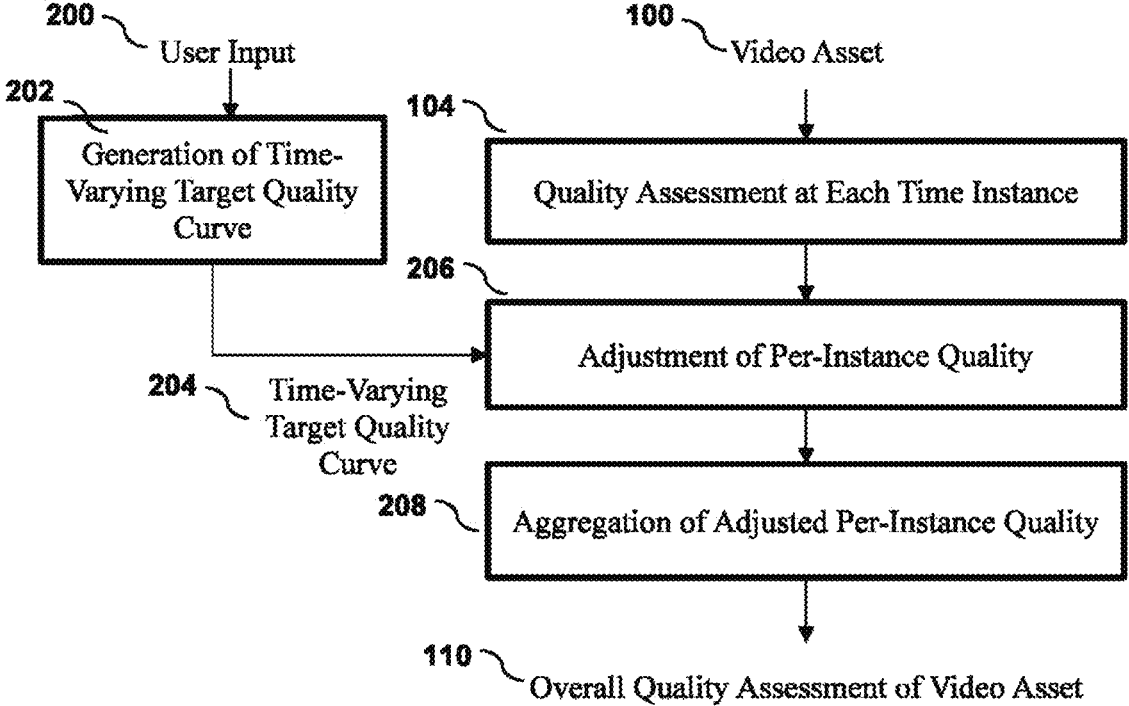
FIG. 2 illustrates an example of the flow diagram to assess the quality of a video asset given user input of time-varying target quality.

With reference to FIG. 2, another aspect of the present disclosure relates to receiving a user input 200 on the target quality at each time instance that at operation 202 creates a time-varying target quality curve 204. The user input 200 can be received continuously or in a discrete manner, may be provided on premise or using a cloud-based platform, and may be obtained manually or through an automated process. Similar to as shown in FIG. 1, in FIG. 2 the quality assessment operation 104 is performed of a video asset 100 at each time instance. However as compared to FIG. 1, another aspect of the present disclosure relates to adjusting the per-instance quality at operation 206 and aggregating the adjusted per-instance quality 208 based on the time-varying target quality curve 204. These adjustment methods may include performing temporal filtering by applying FIR filters and/or IIR filters, clipping instance quality scores based on the time-varying target quality curve 204, and performing transformation to per instance quality scores and then modifying the scores in the transform domain using the time-varying target quality curve 204. Eventually, and similar to as shown in FIG. 1, the overall quality score 110 of the video asset 100 is provided after carrying out aggregation at operation 208.

FIG. 2 demonstrates how a time varying target quality curve 204 is provided by the user input 200 to adjust per-instance quality at operation 206. The user input 200 can be in the form of a time varying target quality curve 204 or may be taken by an automated method or system that generates a time varying target quality curve 204. The method or system for acquiring user inputs 200 is flexible. For example, user inputs 200 may be obtained from preset or instantaneous manual adjustment of a sliding bar or a dial physically or on a computer screen, where the scale on the sliding bar or dial may be continuous or have discrete stops. The user inputs 200 may also be taken automatically. For example, it may be adjusted/dialed by an automatic control system which makes decisions based on the variations of viewership or user preference.

One aspect of the present disclosure involves assessing video quality at each time instance. The quality assessment at a time instance may be done by assessing a single video frame of the video at the time instance or a time segment that is composed of multiple consecutive frames of the video asset near the time instance. Here a video frame may be considered near a time instance if the time index associated with the video frame is within a small distance from the time instance on the time scale. A small distance may be a predefined number of frames, in an example.

Figure 3:
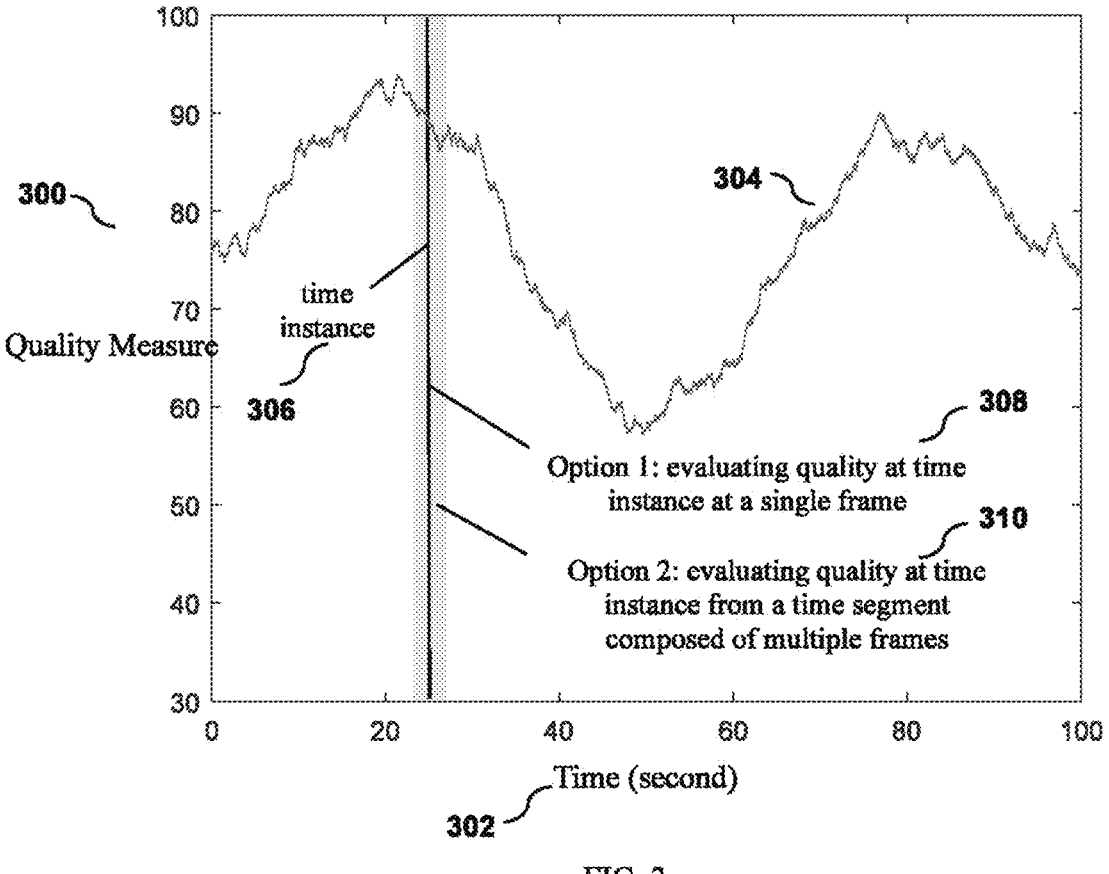
FIG. 3 illustrates an example of a video quality curve as a function of time, where for each time instance, the quality assessment may be based on one video frame corresponding to the time instance, or a time segment composed of multiple consecutive frames near the time instance.

FIG. 3 shows an example of a quality measure 300 plotted with respect to time 302, which creates a quality curve over time 304. At any given time instance 306, the quality computed for that time instance may be conducted with various options. A first of the two options, Option 1, is to evaluate the quality of the time instance from a single frame 308. A second of the options, Option 2, is to evaluate the quality of the time instance from the time segment composed of multiple frames of the video asset near the time instance 310. It should be noted that these are only two possibilities, and more, fewer, and different sets of frames 308 (or potentially partial frames 308) may be used to create the quality curve over time 304.

The quality scores at a time instance in the present disclosure may be obtained by either performing subjective testing, or by computing an objective quality metric. In subjective testing, human subjects are asked to assess the quality of each time instance and provide a quality rating in either discrete or continuous scales. Many methodologies have been proposed for conducting a subjective study. A few of them have been standardized, and are explained in several ITU-R and ITU-T recommendations, among which ITU-R BT.500 and ITU-T P.910 are examples. While overlap exists, the BT.500 recommendation is meant mostly for broadcasting, whereas P.910 focuses more on multimedia content. Common testing procedures can be categorized into two main groups: single stimulus testing, and double or multiple stimulus. In the former method, subjects are asked to watch only one image or video sequence, and each sequence is rated individually while in the latter method, subjects watch multiple sequences at the same time. Absolute Category Rating (ACR), absolute category rating with hidden reference (ACR-HR), and Single Stimulus Continuous Quality Evaluation (SSCQE) are methods of single stimulus testing. In ACR, subjects give discrete scores often using "bad", "poor", "fair", "good", and "excellent" labels. The labels may also be translated to the values 1, 2, 3, 4 and 5. In SSCQE, a sequence is rated continuously over time using a slider device. There are also known approaches for performing double stimulus testing such as Double Stimulus Continuous Quality Scale (DSCQS), Double Stimulus Impairment Scale (DSIS), and pair comparison (PC). In DSCQS, the viewer sees an unimpaired reference and the impaired sequence in a random order. The viewer in DSIS sees an unimpaired reference video, then the same video impaired, and after that they are asked to rate the quality of the second video. In a paired comparison approach, subjects are able to watch two sequences, typically the reference and the impaired one, on the same display and at the same time. Regardless of the selected approach in conducting subjective study, at the end and by analyzing the scores, mean opinion scores (MOSS) are derived from collected scores, to determine the quality of the video asset. While subjective assessment may provide more reliable quality scores to video assets, they are often expensive and time consuming. Therefore, numerous objective measures have been proposed to replace subjective assessment procedure. Examples of objective video quality metrics include MSE. PSNR, MAE. SSIM, Multi-Scale SSIM (MS-SSIM), VQM, SSIMPLUS, and VMAF.

Yet another objective measure can be defined by inferring the quality as a monotonically increasing function with respect to the bitrate or resolution of the video:

$$Q_{infer}=f(R) \tag{1}$$

where R is either the bitrate or the (spatial or temporal) resolution of the video asset, $Q_{infer}$ is the inferred objective video quality from R, and $f$ is a monotonically increasing function.

Another aspect of the present disclosure relates to adjusting the per-instance quality at operation 106 or 206 based on the given target quality 102 or time varying target quality curve 204. The methods for making adjustment may include performing an operation on the curve of per-instance quality over time, and specifically may include FIR and IIR linear filtering, non-linear filtering such as median and order statistical filtering, clipping by a threshold value, and applying a linear or non-linear transformation to the per-instance quality curves followed by linear, non-linear filtering or clipping operations. One of such an example is clipping the raw per-instance quality score by a threshold that is calculated as a function of target quality.

Figure 4:
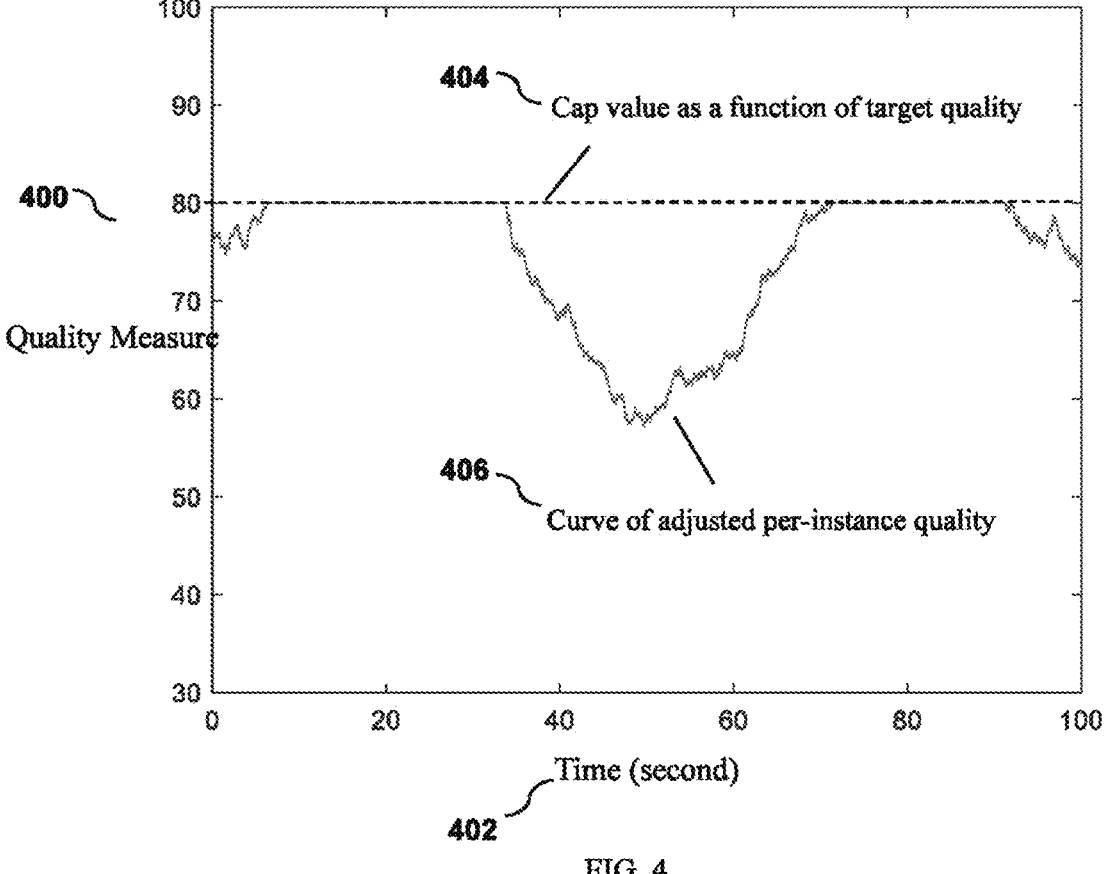
FIG. 4 illustrates an example of generating a curve of adjusted per-instance quality as a function of time, where the video quality curve as given in FIG. 3 is clipped by a cap value determined as a function of the target quality.

One of such an example of adjustment is illustrated in FIG. 4, which shows a quality measure 400 plotted with respect to time 402. A cap value as a function of the target quality 404 is predetermined and applied on top of a raw sample quality curve shown as 304 in FIG. 3. The clipping operation using the cap value results in the adjusted per-instance quality curve 406. In yet another aspect of the present invention, the cap value may be pre-determined as a function of the target quality plus a delta value that is either constant:

$$Q_{cap}=Q_{target}+\Delta Q \tag{2}$$

where $Q_{target}$ is the target quality level, $\Delta Q$ is a constant value that may be positive, negative or zero, and $Q_{cap}$ is the cap value used as the threshold to make the adjustment of the quality score. The cap value may also be determined by a monotonically increasing function of the target quality value:

$$Q_{cap}=g(Q_{target}) \tag{3}$$

where g is a monotonically increasing function, for which examples include linear and exponential functions. After the $Q_{cap}$ value is applied to the per-instance quality score Qom as a threshold for clipping, the adjusted quality value is given by $$Q_{new} = \begin{cases} Q_{cap} & \text{if } Q_{old} > Q_{cap} \\ Q_{old} & \text{otherwise} \end{cases} \tag{4}$$

where $Q_{new}$ is the adjusted per-instance quality score.

Another aspect of the present disclosure aggregates the curve of adjusted per-instance quality to produce an overall quality assessment of the video asset. The aggregation methods can use adjusted per-instance quality values fully or partially. Examples of such aggregation operations include:

Computing the direct average of all per-instance quality values;

Computing a percentile average of the per-instance quality values, where given a percentile value p between 0 and 100, all per-instance quality values are ranked from low to high, and then the lowest (or highest) p percent of all values are extracted and averaged;

Computing a weighted average of the per-instance quality values, where the weights given to individual per-instance quality values are determined by content type and importance (e.g., main content versus advertisement), viewer preference (e.g., like or dislike scores by users, or user viewing frequencies), the per-instance quality values, or the ranks of per-instance quality values; or Computing the median of the per-instance quality values.

Yet another aspect of the present disclosure relates to aggregating the adjusted per-instance quality into an overall quality assessment of the video asset by extracting a time window and computing a quality assessment of the time window as the average, percentile average, weighted average, or median of the adjusted per-instance quality values over the time window. Then, moving the starting and ending points of the time window over time may create a time varying quality curve by the quality assessment of the moving time window.

Figure 5:
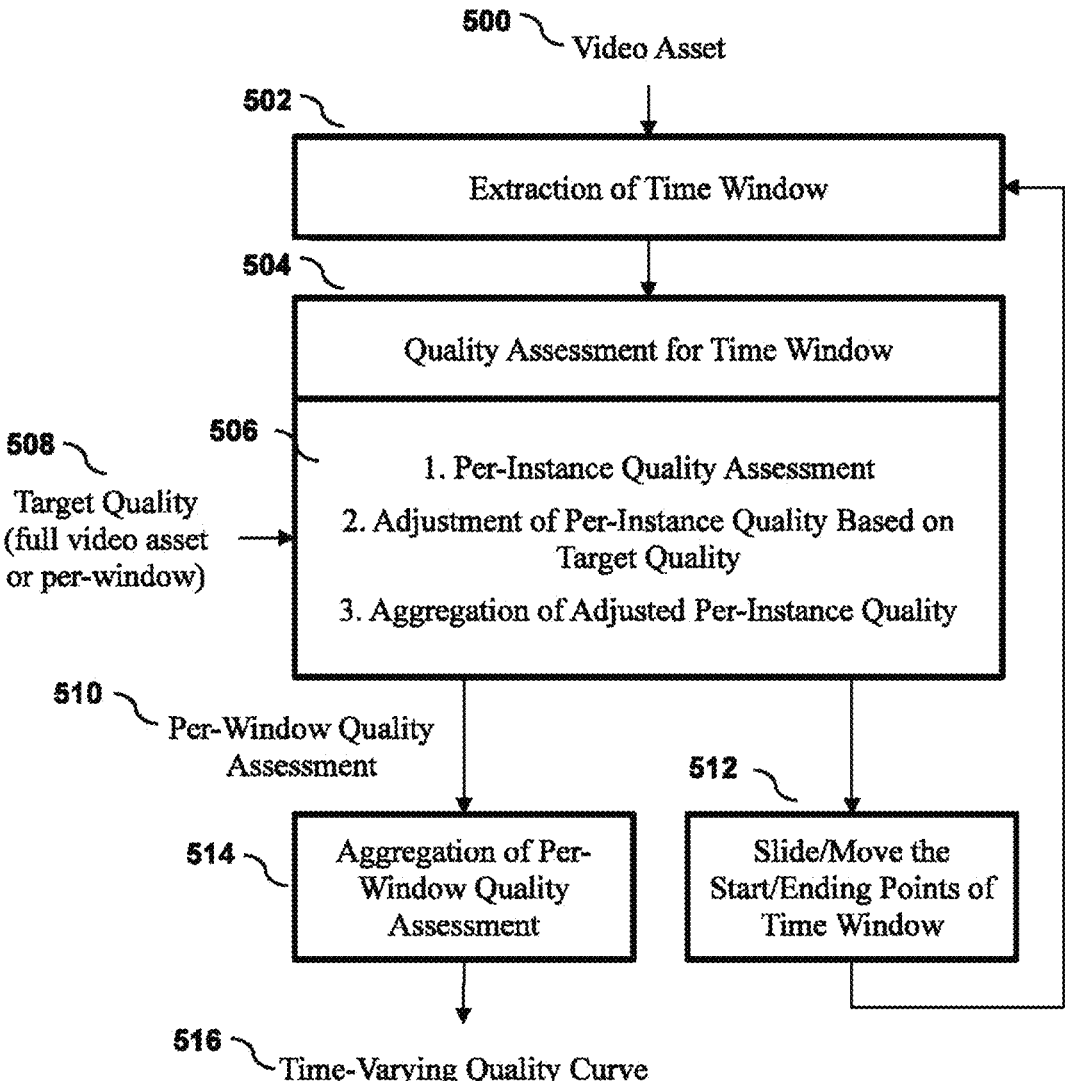
FIG. 5 illustrates an example of the flow diagram to aggregate adjusted per-instance quality using a moving window approach into a time varying quality curve of the video asset.

An example of flow diagram of such a method or system is provided in FIG. 5, where given a video asset 500, a time window is extracted from the video asset at operation 502. The quality assessment of the time window 504 follows a similar approach as in FIG. 1, but that the per-instance quality assessment, adjustment and aggregation is restricted within the window 506. The target quality 508 for the window may be adopted from the target quality of the entire video asset and may also be defined on a per-window basis. The per-window quality assessment to produce a measure of per-window quality assessment 510 includes the steps of computing a per-instance quality score, adjusting the per-instance score, and finally aggregating the adjusted scores, all operated within the window. The time window may be repeated and may move to the next time window by sliding/moving the starting and ending points of the time window together at operation 512, and repeating the process from operations 502 to 506 to the next time window. The iterations may continue until the end of the video asset 500, resulting in a collection of per-window quality assessment scores. An aggregation on the per window quality scores is performed at operation 514 to generate a time varying quality curve 516 for the entire video asset 500.

Figure 6:
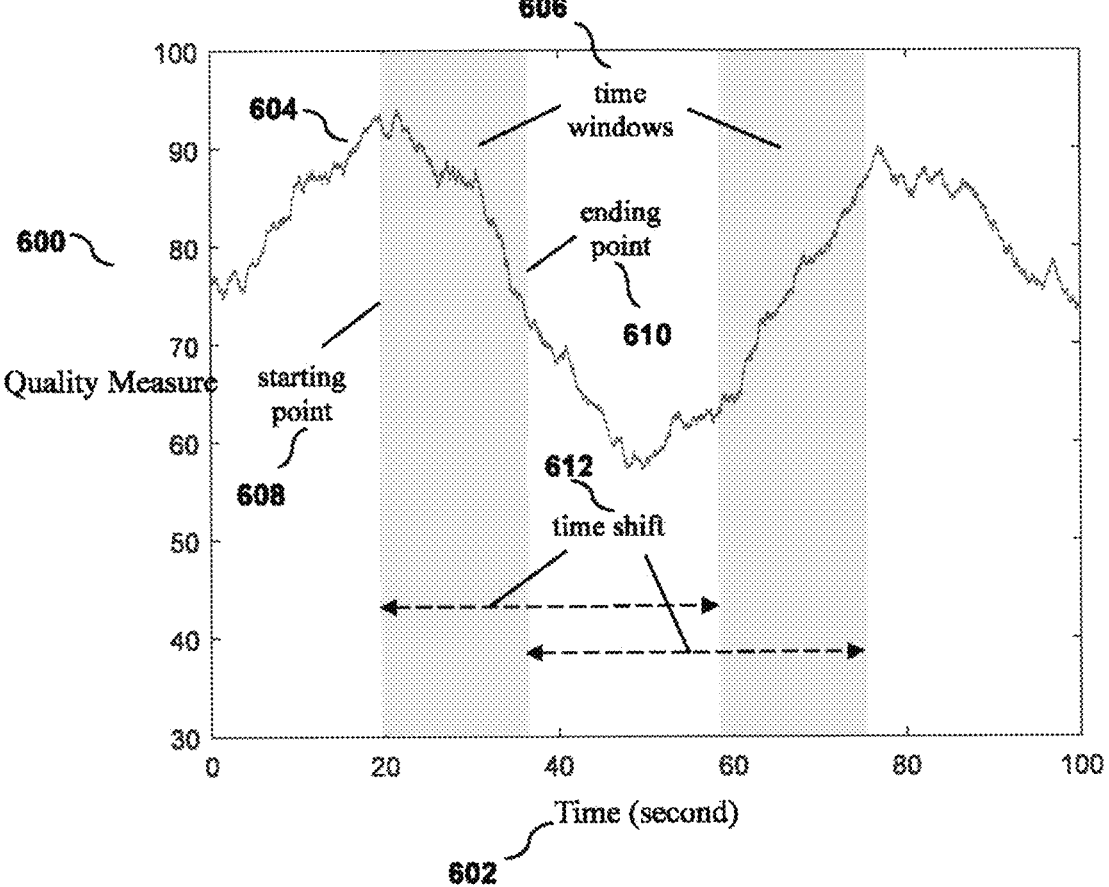
FIG. 6 illustrates an example of moving windows.

FIG. 6 illustrates an example of how the time window moves and per-window quality scores are computed. Given a quality measure 600 calculated over time 602, yielding a quality curve 604, a time window 606 may be defined with a starting point 608 and an ending point 610 on the time axis. When the starting and ending points of the time window moves to a new position by a time shift 612, a new time window is created. The steps of the time shifts may be frame by frame, which is also known as sliding the window. But the shifting steps may also take a stride larger than 1 frame. Depending on the stride, the time windows created may overlap or may not overlap with each other. A smaller stride leads to denser window distribution and more precisely localized quality assessment but leads to higher computational cost. A larger stride leads to coarser window distribution and less precisely localized quality assessment but requires lower computational cost.

Another aspect of the present disclosure relates to optimal encoding of a video asset or a time window of a video asset given a target quality or a time-varying target quality curve. Encoding refers to the techniques to compress the video to a bitrate lower than its original bitrate. A video encoder encodes or compress a video into an encoded/compressed bit stream, while a video decoder decodes or decompress the encoded/compressed bit stream to a decoded/decompressed video. A pair of a video encoder and decoder may be referred to as a video codec. Many video coding methods have been proposed in the past decades, and several video coding standards and open source projects have been widely used in the industry. Examples include MPEG-1, MPEG-2, H.264/AVC, H.265/HEVC, VP9, AV1, EVC, VVC, etc. For each encoding method, a number of coding parameters need to be determined when encode a video asset. The collection of such coding parameters is referred to as the coding configuration. As such, optimal encoding of a video asset aims to choose the best coding configuration that produce the best quality of the encoded video while maximally compress the video to the lowest bitrate. The coding configurations may also be applied to a time window of the video asset, and when chosen in an optimal way, produces optimized encoding of the whole video asset composed of a collection of time windows.

The goal of the video encoding is to compress the bitrate of a video asset to be as small as possible, while maintaining as high quality as possible. An important process in a video encoder is rate-distortion optimization (RDO), which controls the compromise between the bitrate and quality of the compressed video. The primary information loss or equivalent quality loss happens in the quantization stage, where the transformed residual coefficients are quantized into a coarse level to facilitate data compression. The level of quantization is typically controlled by the quantization parameter (QP), which determines the step size used to represent the transformed coefficients with a finite set of steps. A higher value of QP means a larger step size is used, which eventually leads to lower bitrate or higher compression ratio. To control the tradeoff between compressing the videos and keeping the distortion levels in a certain range, a rate control method may be used by a video encoder to estimate how much bitrate will be needed for a particular video frame or a portion of a video frame with certain characteristics and to determine the value of QP to be used. Depending on the application, an effective rate control model may be used to meet at least one of the following goals: maintain a constant average bitrate throughout the whole asset irrespective of the content complexity; use variable bitrate to accommodate the content complexity so that simple content will be allocated low bitrate; or use variable bitrate to accommodate the content complexity with target to provide constant quality of a video, with a target of any one of the above and also considers the other constraints, such as the maximum average bitrate across the whole video or every second, and limitation of bitrate fluctuation. The rate control model that serves the first mentioned scenario is known as Constant Bit Rate (CBR) model, while Variable Bit Rate (VBR) model is meant to meet the second goal mentioned above. The third use case is often handled by rate control models that aim to deliver relatively uniform quality given their bitrate budget. The specific parameters used to control quality level are defined differently in different video encoders. For example, the x.264 and x.265 encoders use Constant Rate Factor (CRF), while MediaConvert encoder uses Quality driven Variable BitRate (QVBR) as the quality control factor.

Figure 7:
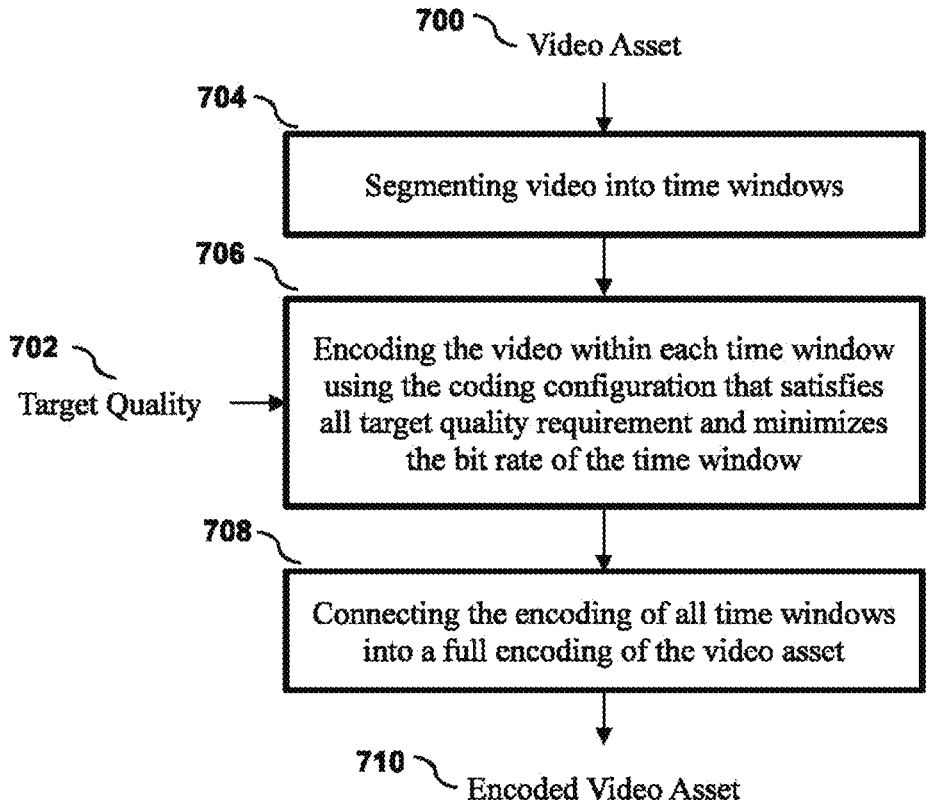
FIG. 7 illustrates an example of the flow diagram to encode a video asset to achieve target quality.

Another aspect of the present disclosure relates to encoding of a video asset given a target quality or a time-varying target quality curve. An example of the flow diagram is illustrated in FIG. 7, where given a video asset 700 and a target quality 702, the video asset is first segmented into multiple time windows at operation 704. For each time window, the video content within the window is encoded with the optimal encoding configuration that satisfies all target quality requirement and minimizes the bit rate of the time window within the time window at operation 706. The specific configuration may include parameters regarding the rate control model, bitrate, resolution, maximum allowable bitrate, number of frames inside each group of pictures (GoP), etc, to reach the given target quality while spending minimum possible bits for each time window. Eventually all encoded video segments are connected/stitched together at operation 708 to a full encode of the video asset to form the full encoded version of the video asset 710.

Another aspect of the present disclosure relates to optimally encoding the video asset using a coding configuration that performs a joint rate-distortion optimization. The objective of the optimization problem is to manage the tradeoffs between spending the lowest average bitrate of the whole asset while obtaining the highest possible overall quality of the video asset, where the quality is assessed as mentioned earlier in the present disclosure.

Figure 8:
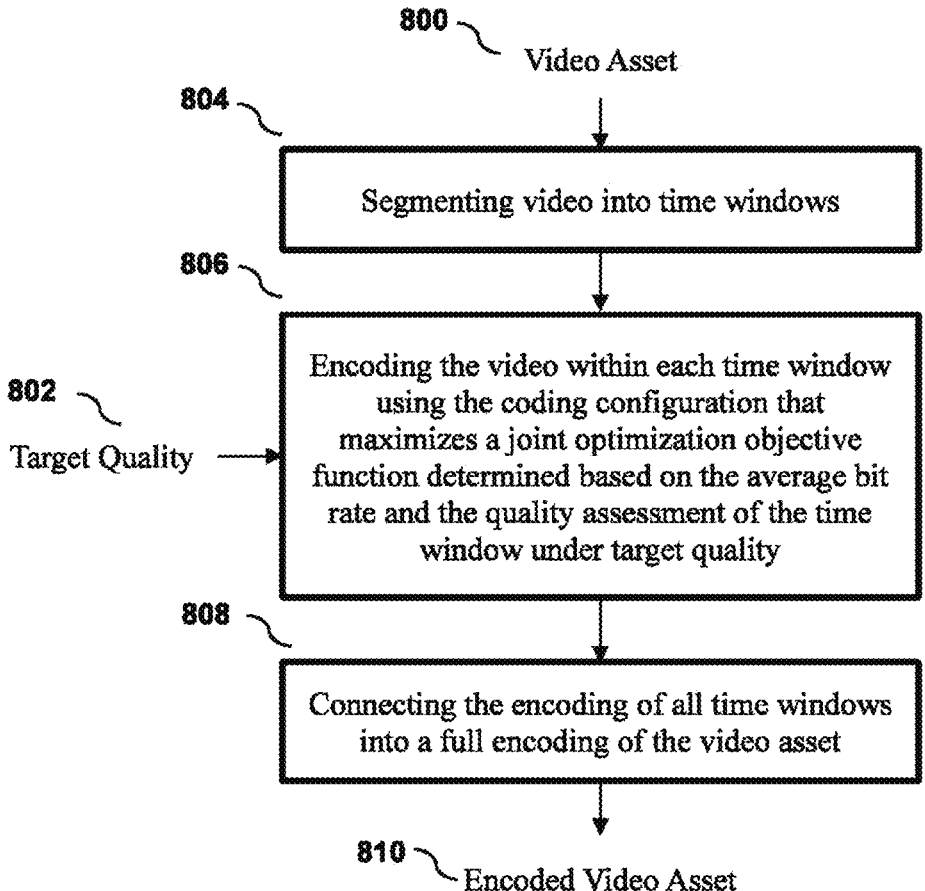
FIG. 8 illustrates an example of the flow diagram to encode a video asset optimally for a joint objective function determined based on both bit rate and quality.

An example of the flow diagram of such a method or system is provided in FIG. 8, where a video asset 800 and a target quality 802 are given as the inputs. After segmenting the video into time windows at operation 804, the video content in the time windows are encoded using the coding configuration that maximizes a joint optimization objective function determined based on the average bit rate and the quality assessment of the time window under target quality at operation 806. Eventually all encoded video segments are connected/stitched together at operation 808 to a full encode of the video asset to form the full encoded version of the video asset 810.

The performance of optimal video encoding may be expressed as maximize quality while satisfying bitrate constraint, given by $$\text{Max}\{Q\} \text{ subject to } R<R_c. \qquad (5)$$

where Q and R are the quality and bitrate of the encoded videos, respectively, and $R_c$ is the maximum bitrate allowed to encode the video. Such an optimization problem may be solved using a Lagrangian multiplier approach. Given the video asset quality as computed in the present disclosure, another aspect of the present disclosure creates an optimal video encode by optimizing a joint optimization objective function as the sum of the overall quality of a video asset or the quality assessment of a time window, and the product of the average bit rate of the video asset and a Lagrange parameter, given by $$\text{Max}\{J\} \text{ where } J=Q+\lambda R \qquad (6)$$

where J is the joint overall cost, and $\lambda$ is the Lagrangian multiplier.

Considering (6) as an optimization, the optimal encoding is converted to finding the best coding configuration in the form of coding parameter P that maximizes J in (6). The exact coding parameter P may be different in different video coding methods. Some specific examples include the QP parameter, the CRF parameter in x.264 and x.265, and the QVBR parameter in MediaConvert encoder.

Yet another aspect of the present disclosure relates to selecting the optimal encoding parameter P by finding the optimal Lagrangian multiplier parameter A. FIG. 9 gives an example of flow diagram of one aspect of the present disclosure for optimal encoding that constitutes the following steps: computing, at operation 900, the derivative of the average bitrate with respect to an encoding parameter denoted as P; computing, at operation 902, the derivative of the overall quality of the video asset with respect to P; determining, at operation 904, an optimal Lagrange multiplier parameter A based on the ratio between the derivative of the overall quality of the video asset with respect to P and the derivative of the average bit rate of the video asset with respect to P; and determining, at operation 906, the coding parameter P 908 using the optimal Lagrange multiplier parameter A.

The methods and systems provided in the present disclosure may be applied in a variety of video communication services, including cable, satellite, IPTV video networks, Internet video services, content delivery networks (CDNs), video on demand, and video conferencing services. The benefits of applying the present disclosure in these video communication services are manifold. First, the present disclosure offers an accurate approach to evaluate the quality of a video asset when a target quality or a time-varying target quality curve is available. Second, the present disclosure produces optimal video encoding that achieves best quality of encoded video asset while keeping the bitrate low. Third, in terms of video quality assessment, the present disclosure favors the video asset that has constant, nearly constant, or smooth quality level over time, especially when the quality level is close to the target quality. Fourth, in terms of optimal video coding, the present disclosure produces video encode that has constant, nearly constant, or smooth quality over time. This benefits many video communication services that desire video assets to have constant quality. Fifth, the present disclosure provides a flexible and easy-to-operate framework for users to easily adjust (or dial) video quality manually or automatically. Since the target quality is decided by user input and such input can change over time, a video quality "dial" application may be implemented using the method and system of the present disclosure.

Figure 10:
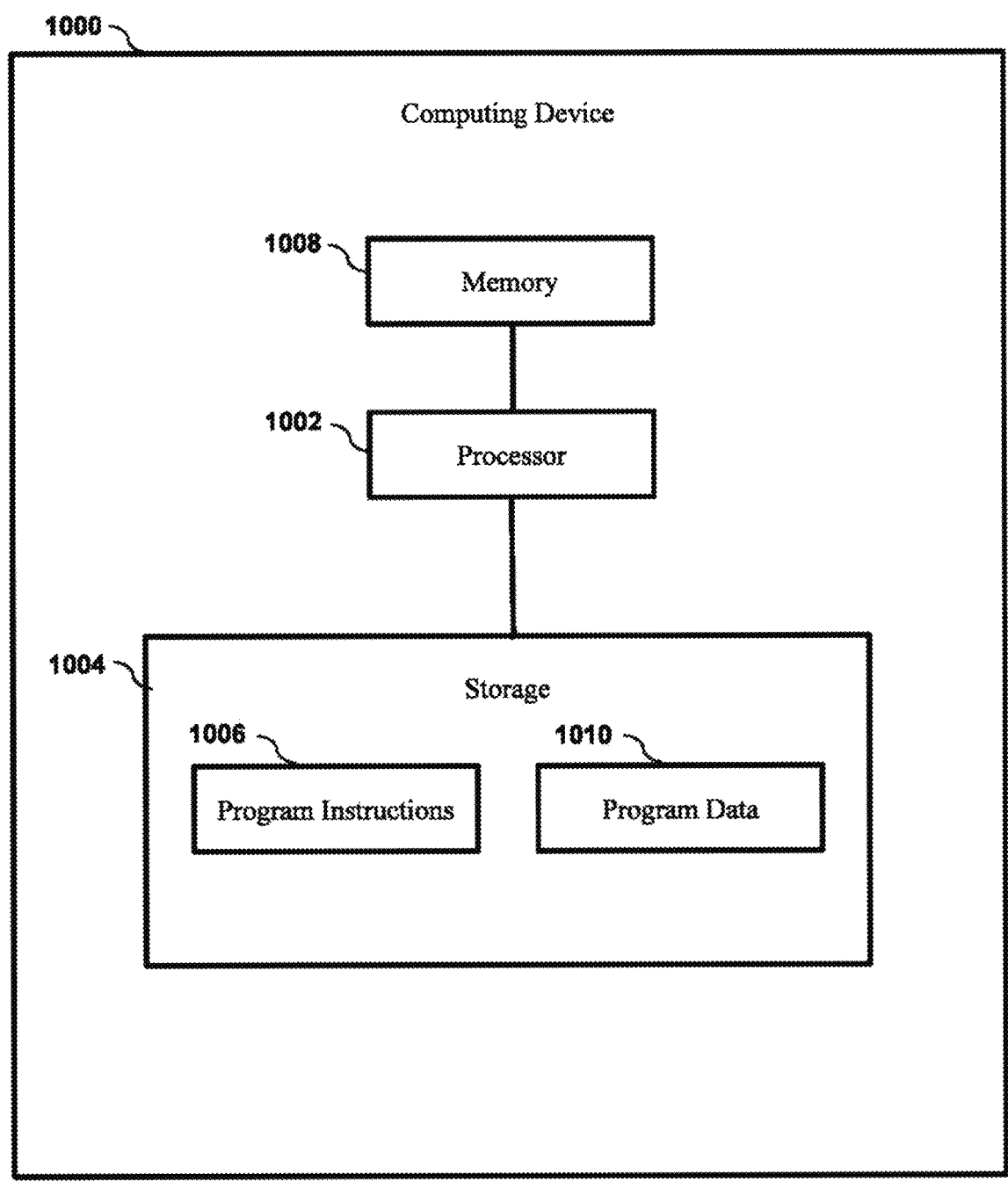
FIG. 10 illustrates an example of a computing device for the performance of the quality assessment and optimization of digital videos in video distribution systems.

FIG. 10 illustrates an example of a computing device 1000 for the performance of the quality assessment and optimization of digital videos in video distribution systems. As shown, the computing device 1000 includes a processor 1002 that is operatively connected to a storage 1004 and a memory 1008. It should be noted that this is merely an example, and computing devices 1000 with more, fewer, or different components may be used.

The processor 1002 may include one or more integrated circuits that implement the functionality of a central processing unit (CPU) and/or graphics processing unit (GPU). In some examples, the processors 1002 are a system on a chip (SoC) that integrates the functionality of the CPU and GPU. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 1002 executes stored program instructions 1006 that are retrieved from the storage 1004 into the memory 1008. The stored program instructions 1006, accordingly, include software that controls the operation of the processor 1002 to perform the operations described herein. The storage 1004 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory 1008 includes static and dynamic random-access memory (RAM) that stores program instructions 1006 and program data 1010 during operation of the systems and methods described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing video quality of a video asset, comprising:

inputting the video asset, wherein the video asset includes a sequence of image frames with a plurality of time instances;

assessing the video quality of the video asset at the plurality of time instances of the video asset to determine a plurality of raw per-instance quality measures;

inputting a time-varying target quality;

using the time-varying target quality to adjust the raw per-instance quality measures to produce a plurality of adjusted per-instance quality measures; and determining an overall quality score of the video asset based on the plurality of the adjusted per-instance quality measures wherein adjusting per-instance quality measures includes clipping the raw per-instance quality measures to a cap value that is computed as a function of the time-varying target quality.

2. The method of claim 1, further comprising:

creating a time-varying target quality curve based on user input with respect to the time-varying target quality at each of the plurality of time instances.

3. The method of claim 1, further comprising, in assessing the video quality at each time instance of the plurality of time instances, one or more of:

assessing the video quality at a frame of the video asset corresponding to the respective time instance, or assessing the video quality of a time segment composed of multiple consecutive frames of the video asset near the respective time instance.

4. The method of claim 3, wherein the assessing of the video quality at each of the plurality of time instances further includes conducting subjective testing.

5. The method of claim 3, wherein the assessing of the video quality at each of the plurality of time instances further includes computing an objective video quality metric.

6. The method of claim 3, wherein the assessing of the video quality at each of the plurality of time instances further includes inferring the video quality as a monotonically increasing function with respect to a video bit rate or a resolution of the video asset.

7. The method of claim 1, further comprising, in computing the cap value as the function of the time-varying target quality, defining the function as the time-varying target quality plus a delta value that is either constant or monotonically increasing with the time-varying target quality value.

8. The method of claim 1, further comprising, in aggregating the adjusted per-instance quality measures into an overall quality assessment of the video asset, computing one or more of an average, percentile average, weighted average, or median of the adjusted per-instance quality measures.

9. The method of claim 1, further comprising, in aggregating the adjusted per-instance quality measures into an overall quality assessment of the video asset:

extracting a time window from the video asset;

computing a quality assessment of the time window as an average, a percentile average, a weighted average, or a median of the adjusted per-instance quality measures over the time window;

moving starting and ending points of the time window over time; and creating a time varying quality curve by the quality assessment of the time window as moved.

10. The method of claim 1, further comprising:

encoding the video asset using a coding configuration that maximizes overall quality of the video asset.

11. The method of claim 10, further comprising:

segmenting the video asset into time windows;

encoding the video asset within each time window of the time windows using the coding configuration that satisfies target quality requirements of the plurality of time instances within the time window and minimizes a bit rate of the time window; and connecting the encoding of the time windows into a full encoding of the video asset.

12. The method of claim 10, further comprising encoding the video asset by:

segmenting the video asset into time windows;

encoding the video asset within each time window of the time windows using the coding configuration that maximizes a joint optimization objective function determined based on an average bit rate and a quality assessment of the time window under the time-varying target quality; and connecting the encoding of the time windows into a full encoding of the video asset.

13. The method of claim 12, further comprising computing the joint optimization objective function as a sum of:

the overall quality of a video asset or the quality assessment of a time window; and a product of the average bit rate of the video asset and a Lagrange parameter.

14. The method of claim 10, further comprising defining the coding configuration as a collection of a coding parameter P assigned to each of the time instances, the coding parameter P including one or more of a quantization parameter, a quality control parameter, or a bit rate.

15. The method of claim 14, further comprising:

computing a derivative of the overall quality of the video asset with respect to the coding parameter P;

computing a derivative of an average bit rate of the video asset with respect to the coding parameter P;

determining an optimal Lagrange parameter based on a ratio between the derivative of the overall quality of the video asset with respect to the coding parameter P and the derivative of the average bit rate of the video asset with respect to the coding parameter P; and determining the coding parameter P using the optimal Lagrange parameter.

16. The method of claim 1, wherein the cap value specifies a constant maximum value for the raw per-instance quality measures below a maximum possible quality score, such that any raw per-instance quality measures exceeding the maximum possible quality score are reduced to the constant maximum value in computing the overall quality score of the video asset.

17. A system for assessing video quality of a video asset, comprising:

a computing device programmed to:

input the video asset, wherein the video asset includes a sequence of image frames with a plurality of time instances;

assess the video quality of the video asset at the plurality of time instances to determine a plurality of raw per-instance quality measures;

input a time-varying target quality;

use the time-varying target quality to adjust the raw per-instance quality measures to produce a plurality of adjusted per-instance quality; and determine an overall quality score of the video asset based on the plurality of the adjusted per-instance quality measures wherein adjusting per-instance quality measures includes clipping the raw per-instance quality measures to a cap value that is computed as a function of the time-varying target quality.

18. The system of claim 17, wherein the computing device is further programmed to:

create a time-varying target quality curve based on user input with respect to the time-varying target quality at each of the plurality of time instances.

19. The system of claim 17, wherein the computing device is further programmed to, in assessing the video quality at each of the plurality of time instances, one or more of:

assess the video quality at a frame of the video asset corresponding to the respective time instance, or assess the video quality of a time segment composed of multiple consecutive frames of the video asset near the respective time instance, whereas to assess the video quality at each of the plurality of time instances further includes one or more of to:

conduct subjective testing, compute an objective video quality metric, or infer the video quality as a monotonically increasing function with respect to a video bit rate or a resolution of the video asset.

20. The system of claim 17, wherein the computing device is further programmed to, in computing the cap value as the function of the time-varying target quality, define the function as the time-varying target quality plus a delta value that is either constant or monotonically increasing with the time-varying target quality value.

21. The system of claim 17, wherein the computing device is further programmed to, in aggregating the adjusted per-instance quality measures into an overall quality assessment of the video asset, compute one or more of an average, percentile average, weighted average, or median of the adjusted per-instance quality measures.

22. The system of claim 17, wherein the computing device is further programmed to, in aggregating the adjusted per-instance quality measures into an overall quality assessment of the video asset:

extract a time window from the video asset;

compute a quality assessment of the time window as an average, a percentile average, a weighted average, or a median of the adjusted per-instance quality measures over the time window;

move starting and ending points of the time window over time; and create a time varying quality curve by the quality assessment of the time window as moved.

23. The system of claim 17, wherein the computing device is further programmed to:

encode the video asset using a coding configuration that maximizes overall quality of the video asset.

24. The system of claim 23, wherein the computing device is further programmed to:

segment the video asset into time windows;

encode the video asset within each time window of the time windows using a coding configuration that satisfies target quality requirements of the plurality of time instances within the time window and minimizes a bit rate of the time window; and connect the encodes of the time windows into a full encoding of the video asset.

25. The system of claim 23, wherein the computing device is further programmed to:

segment the video asset into time windows;

encode the video asset within each time window of the time windows using a coding configuration that maximizes a joint optimization objective function determined based on an average bit rate and a quality assessment of the time window under the time-varying target quality; and connect the encodes of the time windows into a full encoding of the video asset.

26. The system of claim 25, wherein the computing device is further programmed to compute the joint optimization objective function as a sum of:

the overall quality of a video asset or the quality assessment of a time window; and a product of the average bit rate of the video asset and a Lagrange parameter.

27. The system of claim 23, wherein the computing device is further programmed to define the coding configuration as a collection of a coding parameter P assigned to each of the time instances, the coding parameter P including one or more of a quantization parameter, a quality control parameter, or a bit rate.

28. The system of claim 27, wherein the computing device is further programmed to, in determining the coding parameter P:

compute a derivative of the overall quality of the video asset with respect to the coding parameter P;

compute a derivative of an average bit rate of the video asset with respect to the coding parameter P;

determine an optimal Lagrange parameter based on a ratio between the derivative of the overall quality of the video asset with respect to the coding parameter P and the derivative of the average bit rate of the video asset with respect to the coding parameter P; and determine the coding parameter P using the optimal Lagrange parameter.

29. The system of claim 17, wherein the cap value specifies a constant maximum value for the raw per-instance quality measures below a maximum possible quality score, such that any raw per-instance quality measures exceeding the maximum possible quality score are reduced to the constant maximum value in computing the overall quality score of the video asset.

* * * * *